United States Patent [19]

Mizoguchi

[11] Patent Number: 5,254,937
[45] Date of Patent: Oct. 19, 1993

[54] POWER SUPPLY CONTROL DEVICE HAVING MEMORY TABLES FOR PROVIDING A STABILIZED OUTPUT

[75] Inventor: Shigeru Mizoguchi, Kawasaki, Japan

[73] Assignee: Canon Kabushiki Kaisha, Tokyo, Japan

[21] Appl. No.: 664,478

[22] Filed: Mar. 4, 1991

Related U.S. Application Data

[63] Continuation of Ser. No. 409,321, Sep. 19, 1989, abandoned.

[30] Foreign Application Priority Data

Oct. 6, 1988 [JP] Japan .................. 63-250941

[51] Int. Cl.[5] ............... G05F 1/565; H02M 3/157
[52] U.S. Cl. .................. 323/283; 323/265; 323/349; 363/41; 363/95
[58] Field of Search ............ 363/41, 95, 97, 98, 363/17, 21; 323/265, 283, 349

[56] References Cited

U.S. PATENT DOCUMENTS

| | | | |
|---|---|---|---|
| 4,447,786 | 5/1984 | Saar et al. | 363/41 X |
| 4,595,976 | 6/1986 | Parro, II | 363/98 X |
| 4,598,243 | 7/1986 | Kawakami | 323/349 |
| 4,615,000 | 9/1986 | Fujii et al. | 363/41 |
| 4,622,628 | 11/1986 | Murasaki et al. | 363/97 X |

OTHER PUBLICATIONS

"Power MOSFETs take the load off switching supply design" Pelly et al., *Electronic Design*, Feb. 17, 1983, pp. 135-139.

*Primary Examiner*—Emanuel T. Voeltz
*Attorney, Agent, or Firm*—Fitzpatrick, Cella, Harper & Scinto

[57] ABSTRACT

Control apparatus for controlling a driving unit which receives DC power, wherein the driving unit has a detecting device for detecting a driving condition of the driving unit, includes detection circuitry for detecting a power supply condition of the DC power supplied to the driving unit. A memory is provided for storing a predetermined range of driving unit driving condition values verses a predetermined range of driving unit control signals. The memory has a plurality of tables, each table storing a portion of the predetermined range of driving unit driving condition values and a corresponding portion of the predetermined range of driving unit control signals. A control unit is provided for (1) selecting one of the plurality of tables according to the detected power supply condition, (2) selecting a driving unit control signal according to the detected driving condition of the driving unit, and (3) controlling the driving unit in accordance with the selected driving unit control signal.

33 Claims, 3 Drawing Sheets

ND MEMORY TABLES FOR PROVIDING A STABILIZED OUTPUT

POWER SUPPLY CONTROL DEVICE HAVING MEMORY TABLES FOR PROVIDING A STABILIZED OUTPUT

This application is a continuation of application Ser. No. 07/409,321 filed Sep. 19, 1989 now abandoned.

BACKGROUND OF THE INVENTION

1. Field of the Invention

This invention relates to an electronic apparatus having a power supply unit for supplying electric power to a driving unit performing a predetermined operation of the apparatus, and, since there is the possibility that the output of the power supply unit for the driving unit fluctuates, having control means for performing driving control of the driving unit.

2. Description of the Related Art

Heretofore, in various kinds of electronic apparatuses, batteries or power supply circuits which convert alternating current from a commercial AC power source into direct current have been used as power supplies of the apparatuses. It is common to feed semiconductor devices and driving systems, such as motors, solenoids and the like, of electronic apparatuses via a predetermined stabilization, such as constant-voltage control, constant-current control and the like. There are problems, however, in that some of the circuits, such as constant-voltage power supplies, constant-current power supplies and the like, are inferior in power efficiency, and the configuration of an apparatus becomes complicated. Hence, it is preferable to dispense with these circuits.

On the other hand, in various kinds of electronic apparatuses, there is now widely being used a configuration in which each unit of an apparatus is controlled by a programmable control unit using a microprocessor and the like. In this kind of apparatus, a control table storing data for determining driving conditions of a driving system is provided within a program memory, data, such as ambient temperature, humidity, various kinds of switch settings and the like, are input to the table, and driving voltage, driving current, driving period and the like of motors, solenoids and the like in the driving system are determined.

In such a configuration, it is possible to perform control such that normal operations can be performed even if there are fluctuations in voltage, according to the configuration of the control table. If a stabilizing power supply is not used, data construction of the control table must be provided so as to be operable within the entire range of fluctuating voltage or current in the power source.

When such a table configuration is provided, it is necessary to set operation conditions making allowance for fluctations in the power source. Hence, there are problems in that it is necessary to increase the driving time of the driving system, or to increase the driving voltage, driving current and the like, and the most suitable control can not be performed relative to power efficiency and operation speed.

SUMMARY OF THE INVENTION

It is an object of the present invention to provide an electronic apparatus capable of providing the most suitable driving conditions without using a large-capacity stabilizing power supply and even if there exist fluctuations in the power source.

It is another object of the present invention to provide an electronic apparatus in which, even if the state of an output of a power supply fluctuates, a proper memory table can be selected from among plural memory tables for combining a predetermined input amount with driving conditions of a driving unit, and the most suitable driving control of the driving unit can be performed in accordance with the state of the power supply according to information stored in the selected memory table.

BRIEF DESCRIPTION OF THE DRAWINGS

FIG. 1A is a schematic drawing showing a table divided into one load and plural loads.

DETAILED DESCRIPTION OF THE INVENTION

The present invention will be hereinafter explained in detail according to the embodiment illustrated in the figures.

Figure 1:
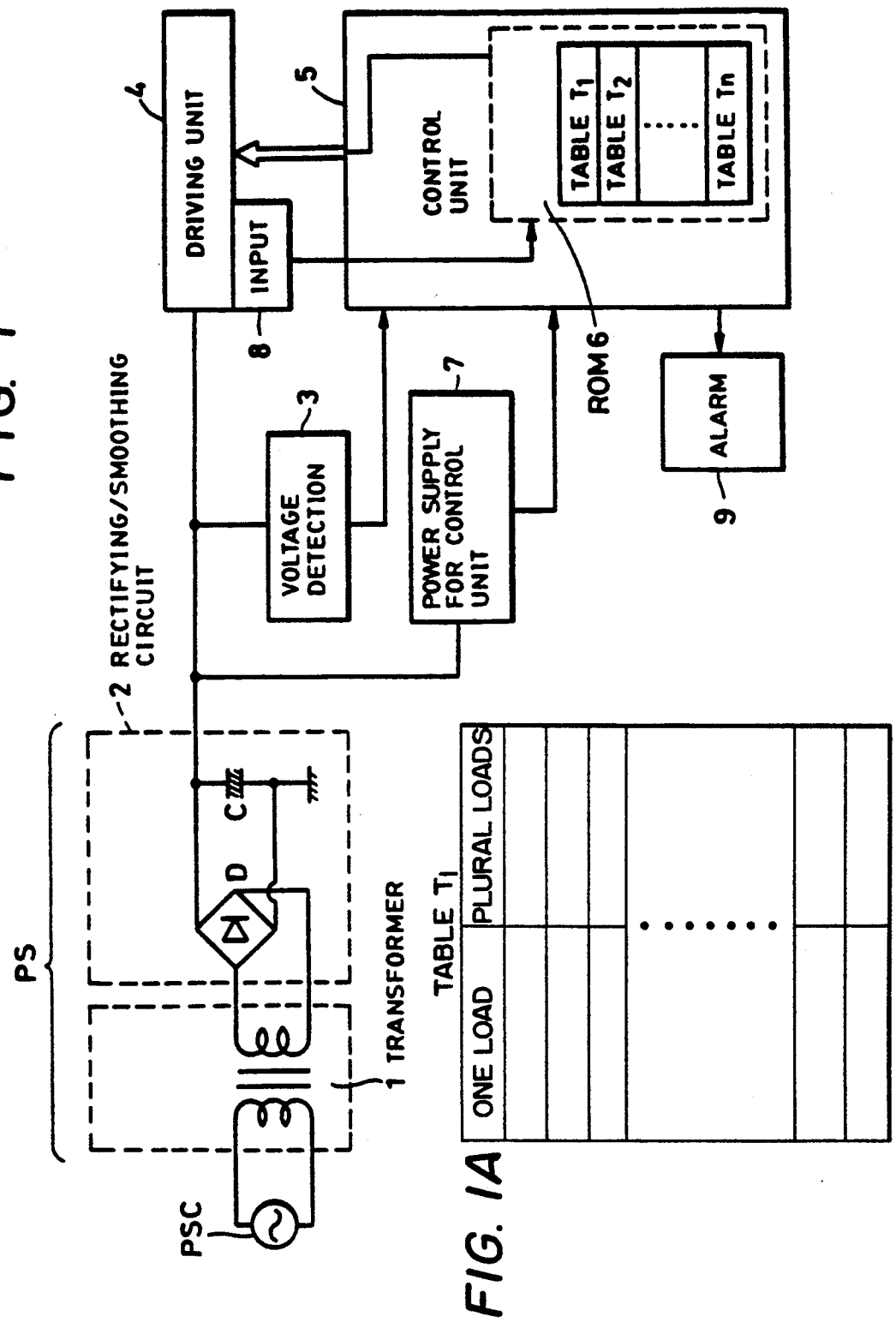
FIG. 1 is a block diagram showing the configuration of a principal part of an electronic apparatus to which the present invention is applied.

FIG. 1 shows the configuration of a principal part of an electronic apparatus to which the present invention is applied. In FIG. 1, a power supply unit PS of the apparatus comprises a transformer 1 for transforming an input from a commercial AC power source PSC into a predetermined voltage, and a rectifying/smoothing circuit 2 consisting of a diode D and a capacitor C. In the present embodiment, the output of the power supply unit PS is input to a driving unit 4 without being stabilized at all.

The driving unit 4 comprises a motor, a solenoid, various kinds of electronic circuits using semiconductors, a display unit and the like. The driving unit 4 is controlled by a control unit 5 comprising a microprocessor and the like for determining the driving conditions of driving unit 4, for example, various kinds of operation timings for driving period, driving voltage, driving current and the like.

In this case, the control unit 5 comprises a one-chip CPU, and incorporates a ROM 6 storing programs which will be described later. Feeding power to for the control unit 5 is performed via a power supply 7 for control unit which stablizes the output of the power supply unit PS. The power supply 7 for control unit is for feeding power to the control unit 5 and comprises semiconductor chips having small power consumption, and may be a quite simple small-capacity stabilizing circuit using, for example, a three-terminal regulator and the like.

In the present embodiment, when determining operation conditions of the driving unit 4, the control unit 5 receives driving conditions, such as various kinds of switch settings, ambient temperature, humidity and the like, from an input unit 8 consisting of sensors, switches and the like, and inputs the conditions to control tables provided within the ROM 6, and determines the final driving period, driving voltage/current, driving interval and the like of the driving unit 4. There is not, as in the prior art, only one kind of control table, but rather n control tables, $T_1$-$T_n$, are stored within the ROM 6.

Not all of the tables $T_1$-$T_n$ are used together, but instead one of them is selected in accordance with the output state of the power supply unit PS. Although various kinds of parameters, such as voltage, current under a predetermined load condition and the like, can be considered as the output state which determines the table selection of the power supply unit PS, the output voltage of the power supply unit PS is used as the output state in this case. The output voltage of the power supply unit PS is detected by a voltage detection circuit 3, and input to the control unit 5. The voltage detection circuit 3 comprises a detection resistance connected between the power source line and the ground, an A/D converter for digitizing a voltage detected by the detection resistance with a predetermined resolution and the like.

Next, the operation in the above-described configuration will be explained in detail with reference to the flow chart in FIG. 2.

Figure 2:
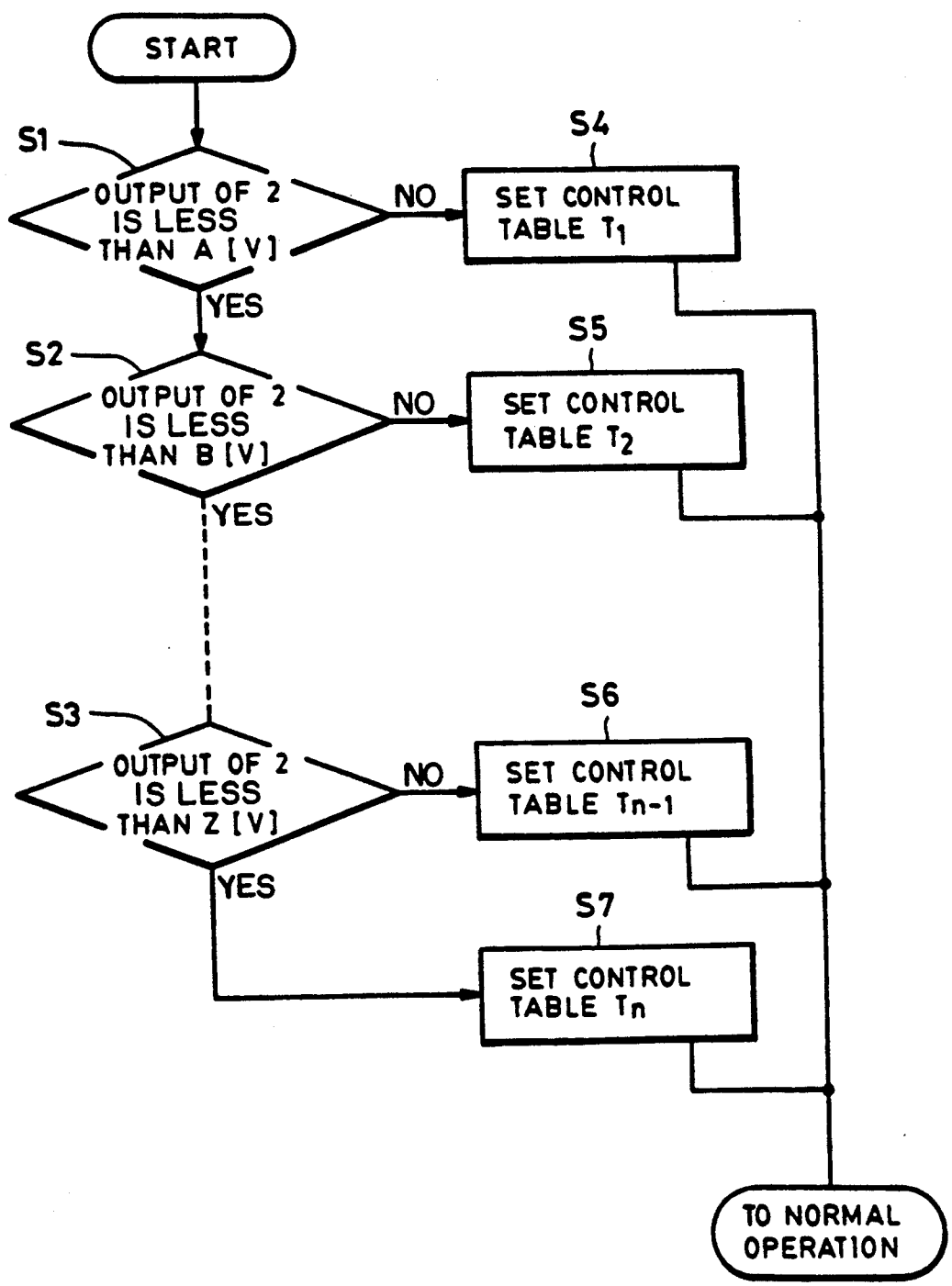
FIGS. 2 and 3 are flow charts showing control procedures of different control units, respectively.

FIG. 2 shows the flow of a program of the control unit 5 stored in the ROM 6.

When alternating current is input from the commercial AC power source PSC to the primary winding of the transformer 1 of the power supply unit PS via a power source switch (not illustrated) or the like, a rectified DC voltage is generated at the output of the rectifying/smoothing circuit 2 in accordance with the winding ratio of the transformer 1. This voltage is not stabilized, and fluctuates under the influence of voltage fluctuations in the commercial AC power source PSC, the load condition of the driving unit 4 and the like.

After power from the power source has been applied, the control unit 5 takes in an output of the voltage detection circuit 3 according to the procedure in FIG. 2, and selects a one table from n kinds of control tables $T_1-T_n$ stored within the ROM 6 in accordance with the detection voltage. Steps S1–S3 in FIG. 2 are determination steps which compare n-1 boundary voltage data with the detection voltage of the voltage detection circuit 3 for selecting from the control tables $T_1-T_n$.

Boundary voltages to be determined at steps S1–S3 are A, B, --- V (volt). The division of the voltage is determined by the expected voltage fluctuation in the power supply unit PS and the number n of the tables to be selected. The division of the boundary voltage is, of course, not necessarily constant. At steps S1–S3, it is determined whether or not an output value of the voltage detection circuit 3 is less than the boundary voltage A, B, ---, respectively. If the answer at any step is negative, the process proceeds to the selection routine from n control tables at steps S4–S7.

At these steps, the control tables $T_1-T_n$ are allocated in the descending order of detection voltage, and one of the control tables $T_1, T_2, --- T_{n-1}, T_n$ is selected at steps S4–S7. When any table selection routine has been completed, the control unit 5 proceeds to a well-known driving control routine. In this driving control routine, various kinds of input amounts, such as environmental conditions, switch settings and the like, are used for accessing one selected table, driving condition data of the driving unit 4 are obtained as output amounts, and various kinds of driving conditions, such as driving current, driving voltage, driving timing and the like, of the driving unit 4 are determined in accordance with the driving condition data.

In the above-described embodiment, the most suitable table for the driving unit 4 is selected from the control tables $T_1-T_n$ in accordance with a fluctuation in output voltage of the power supply unit PS, and used for the control of the driving unit 4. Accordingly, each control table may be configured so that it can perform the most suitable driving only within the range of the corresponding output voltage of the power supply unit PS. Hence, it is not necessary to perform the setting of driving conditions using coarse tolerances as in the prior art, and it is therefore possible to set the most suitable (for example, the most efficient, or high-speed) driving conditions at that power supply voltage.

In the above-described embodiment, a case in which a power-source voltage exceeding proper application conditions is input to the transformer 1 from the commercial AC power source PSC is not considered. Accordingly, at step S3 in FIG. 2, for example, a determination for the power being less than the boundary voltage Z is performed, and the control table $T_n$ is selected even when the power supply input decreases down to a region where the apparatus can not be operated. Hence, there is the possibility that normal operation is not guaranteed. In order to solve this problem, it is considered that upper and lower limits of operable power supply voltage are set, and a control procedure as shown in FIG. 3 is performed.

Figure 3:
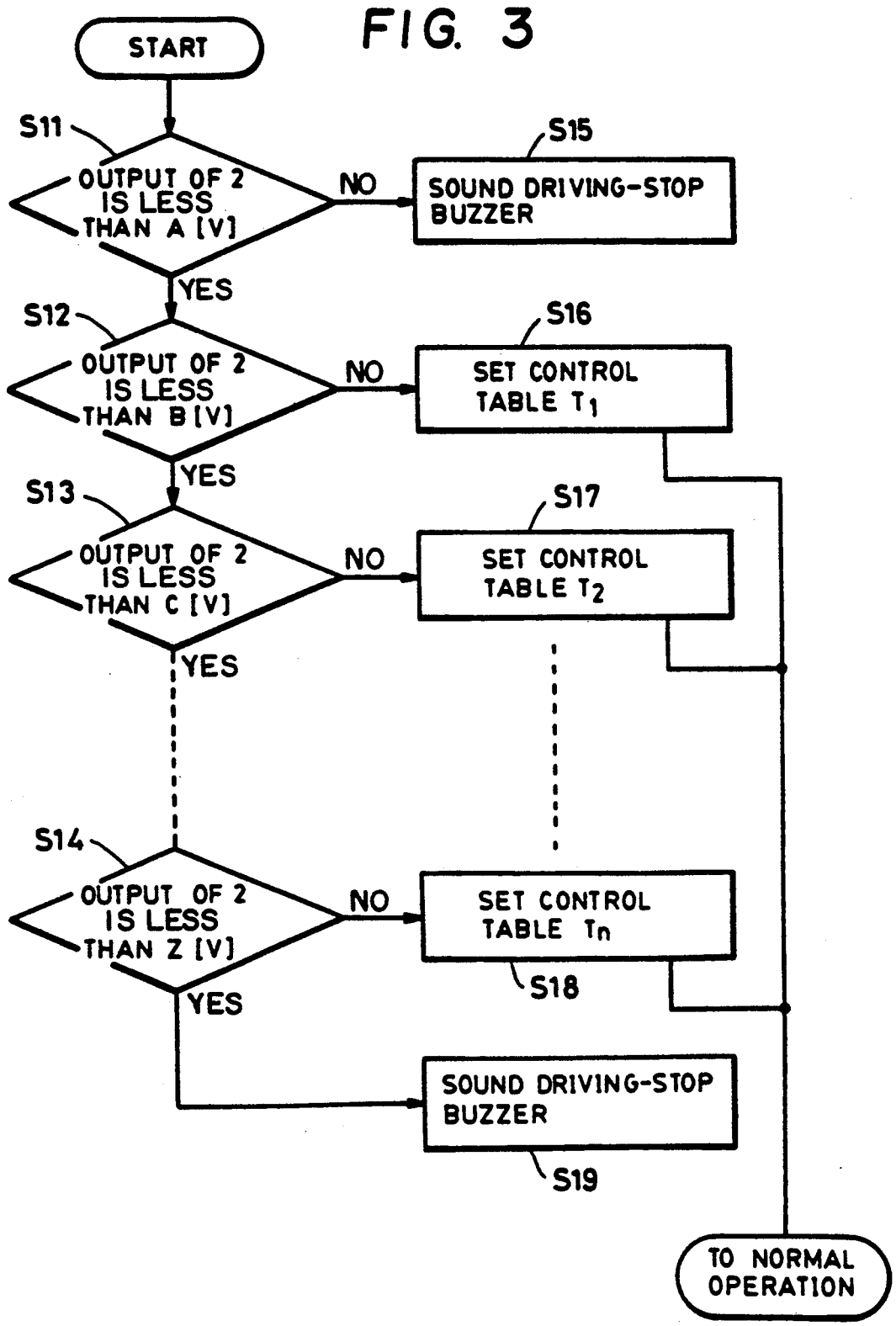

Steps S11–S14 in FIG. 3 are steps of successively comparing the detection voltage of the voltage detection circuit 3 with the boundary voltages A–Z like steps S1–S3 in FIG. 2, but at the steps S11 and S14 the detection voltage is compared with the upper-limit and lower-limit boundary voltages A and Z of the power supply voltage which can guarantee normal operation.

When the answers at the steps S12, S13, --- are affirmative, the appropriate one of the control tables $T_1-T_n$ is selected, respectively, as in FIG. 2. However, when it is determined that the detection voltage of the voltage detection circuit 3 is not less than the upper boundary voltage A at step S11, or that the detection voltage is less than the lower boundary voltage Z at step S14, the operation is stopped, and a warning is generated by sounding a buzzer. As method of warning, the lighting of a lamp, display of warning characters and the like can be considered other than the buzzer, and the warning is performed at a warning unit 9.

In such a configuration, it is possible to select a control table in accordance with a power supply voltage only when the power supply voltage is within the range of a proper power supply voltage, and to set proper driving conditions, and a further operation is stopped when there is an abnormality in power supply voltage. Hence, it is possible to prevent failure and misoperation of the apparatus.

In the embodiment shown in FIGS. 1–3, a control table of the driving unit 4 is selected when power is applied, and subsequently driving is performed by the selected control table. Such a configuration can not deal with a case in which the voltage of the commercial AC power source PSC fluctuates during the operation of the apparatus.

Accordingly, if the procedure in FIG. 2 is performed not only when power first is applied, but also every time an operation instruction of the driving unit 4 is executed to properly reselect a control table, the most suitable and efficient operation becomes always possible according to the selection of a proper control table during operation.

Furthermore, in the configuration of the power supply unit PS as shown in FIG. 1, there is the possibility that the power supply voltage fluctuates due to a change in the number of loads to be fed or load conditions. Considering such a case, the apparatus may be configured such that the driving unit 4 comprises, for example, plural motors, solenoids and the like, and different table data are used, for example, for a case in which a load consisting of one motor, solenoid or the like is driven, and for a case in which two or more loads are simultaneously driven.

That is, one of the control tables T within the ROM 6 may be divided into a table for driving one load and a table for driving plural loads as shown in FIG. 1A, and the divided tables may be selected in accordance with a control state. The number of control tables corresponding to an identical power supply voltage may be properly determined in accordance with the number of loads which are simultaneously driven and the like.

Although a configuration in which a power supply unit transforms and rectifies a commercial AC power source has been shown in the above description, the above-described configuration may, of course, be practiced in an electronic apparatus using various kinds of power supply units, such as a dry cell, a charging-type battery, a solar cell and the like.

As is apparent from the above description, according to the present invention, an electronic apparatus having a power supply unit for supplying electric power for a driving unit performing a predetermined operation of the apparatus, where there is a possibility that the output of the power supply unit for the driving unit fluctuates, adopts a configuration in which there are plural memory tables storing information for determining driving conditions of the driving unit in accordance with a predetermined input amount, means for detecting an output state of the power supply unit, and control means for selecting one proper memory table from the plural memory tables in accordance with an output of the detection means and performing the driving control of the driving unit using the selected memory table. Hence, the present invention has the excellent effects that, without the necessity for setting control conditions having inferior power efficiency or processing efficiency in consideration of the possibility of every fluctuation in the power supply, a proper memory table is selected from the plural memory tables for combining a predetermined input amount with driving conditions of the driving unit, and the most suitable driving control relative to power efficiency and processing efficiency can be performed in accordance with a state of the power supply according to information stored in the selected memory table.

What is claimed is:

1. An electronic apparatus comprising:
   DC power supply means for receiving AC electric power, rectifying the AC electric power and outputting DC electric power;
   detection means for detecting fluctuations of the DC electric power output from said DC power supply means, and for providing a fluctuation detect signal in response to the detected fluctuations;
   memory means for storing a plurality of operating conditions in a plurality of tables, each table corresponding to a different value of the fluctuation detect signal;
   driving means supplied with the DC electric power from said DC power supply means, for stably driving a load in accordance with a table of operating conditions selected in accordance with the fluctuation detect signal; and
   control means for stably controlling said driving means in accordance with the plurality of operating conditions stored in a selected one of the tables, the operating conditions being selected in response to a plurality of drive conditions received from said driving means,
   wherein one of the plurality of tables stored in said memory means is selected in response to the value of the fluctuation detect signal and one of the plurality of operating conditions in the selected table is selected in response to the plurality of drive conditions received from said driving means, so that the load can be stably driven during fluctuations in the DC electric power.

2. An electronic apparatus according to claim 1, wherein said memory means comprises a read-only memory.

3. An electronic apparatus according to claim 1, wherein said detection means includes voltage detection means for detecting a fluctuation in voltage of said DC electric power.

4. An electronic apparatus according to claim 3, wherein said voltage detection means comprises a detection resistance, connected between a power source line of said DC power supply means and ground, and an analog-to-digital converter for digitizing a voltage detected by said resistance with a predetermined resolution.

5. An electronic apparatus according to claim 3, wherein said memory means comprises a read-only memory.

6. An electric apparatus according to claim 1, wherein said memory means further stores boundary values for the fluctuation detect signal, and wherein said control means stops said driving means when the value of the fluctuation detect signal exceeds one of said boundary values.

7. An electronic apparatus according to claim 1, wherein said memory means further stores driving conditions of said driving means for providing the driving of a single load and the driving of a plurality of loads in each of said tables.

8. An electronic apparatus comprising:
   first power supply means for receiving an AC signal, rectifying the AC signal and outputting DC electric power;
   detection means for detecting fluctuations of the DC electric power and providing a fluctuation detect signal in accordance therewith;
   memory means for storing a plurality of operating conditions in a plurality of tables, the tables respectively corresponding to different values of the fluctuation detect signal;
   driving means supplied with the DC electric power from said first power supply means, for stably driving a load in accordance with a table of operating conditions selected in accordance with the fluctuation detect signal;
   control means for stably controlling said driving means in accordance with the plurality of operating conditions stored in a selected one of the tables, the operating conditions being selected in response to a plurality of drive conditions received from said driving means; and
   second power supply means for supplying said control means with DC electric power by stabilizing a fluctuating output supplied by said first power supply means,
   wherein one of the plurality of table stored in said memory means is selected in response to the value of the fluctuation detect signal and one of the plurality of operating conditions in the selected table is selected in response to the plurality of drive conditions received from said driving means, so that the load can be stable driven during fluctuations in the DC electric power.

9. An electronic apparatus according to claim 8, wherein said second power supply means comprises a stabilizing circuit using a three-terminal regulator.

10. An electronic apparatus according to claim 8, wherein said driving means comprises a motor.

11. an electronic apparatus according to claim 8, wherein said driving means comprises a solenoid.

12. An electronic apparatus comprising:
DC power supply means for receiving AC power, rectifying the AC power and outputting DC power;
detection means for detecting fluctuations of the DC power and providing a fluctuation detect signal in response to the detected fluctuations;
memory means for storing a plurality of operating conditions in a plurality of tables, each table corresponding to a different value of the fluctuation detect signal;
driving means supplied with the DC power from said DC power supply means, for stably driving a load in accordance with a table of operating conditions selected in accordance with the fluctuation detect signal;
control means for stably controlling said driving means in accordance with the plurality of operating conditions stored in a selected one of the tables, the operating conditions being selected in response to a plurality of drive conditions of said driving means; and
input means for measuring the plurality of drive conditions of said driving means and supplying the plurality of drive conditions to said control means to select the operating conditions stored within the selected table,
wherein one of the plurality of tables stored in said memory means is selected in response to the value of the fluctuation detect signal and one of the plurality of operating conditions in the selected table is selected in response to the plurality of drive conditions received from said input means, so that the load can be stably driven during fluctuations in the DC power.

13. An electronic apparatus according to claim 12, wherein said input means comprises a sensor.

14. An electronic apparatus according to claim 12, wherein said input means comprises a switch.

15. An electronic apparatus according to claim 12, wherein said input means detects temperature.

16. An electronic apparatus according to claim 12, wherein said input means detects humidity.

17. An electronic apparatus according to claim 12, wherein each tables stores a driving period, a driving voltage, a driving current and a driving interval of said driving means.

18. An electronic apparatus comprising:
DC power supply means for receiving AC power, rectifying the AC power and outputting DC power;
detection means for detecting fluctuations of the DC power output from said DC power supply means, and for providing a fluctuation detect signal in response to the detected fluctuations;
memory means for storing a plurality of operating conditions in a plurality of tables, each table corresponding to a different value of the fluctuation detect signal;
driving means supplied with the DC power from said DC power supply means, for stably driving a load using a table of operating conditions selected in accordance with the fluctuation detect signal;
control means for stably controlling said driving means in accordance with the plurality of operating conditions stored in a selected one of the tables, the operating conditions being selected in accordance with a plurality of drive conditions received from said driving means; and
warning means operative in response to said control means, for providing a warning when the output of said detection means reaches a predetermined threshold value,
wherein one of the plurality of tables stored in said memory means is selected in response to the value of the fluctuation detect signal and one of the plurality of operating conditions in the selected table is selected in response to the plurality of drive conditions received from said driving means, so that the load can be stably driven during fluctuations in the DC power.

19. An electronic apparatus according to claim 18, wherein said warning means is operative to emit a sound.

20. An electronic apparatus according to claim 18, wherein said warning means is operative to display a character display.

21. An electronic apparatus comprising:
first power supply means for receiving AC power, rectifying the AC power and outputting DC power;
detection means for detecting fluctuations of the DC power and providing a fluctuation detect signal in response to the detected fluctuations;
memory means for storing a plurality of operating conditions in a plurality of tables, the tables respectively corresponding to different values of the fluctuation detect signal;
driving means supplied with the DC power from said first power supply means, for stably driving a load using a table of operating conditions selected in accordance with the fluctuation detect signal;
control means for stably controlling said driving means in accordance with the plurality of operating conditions stored in a selected one of the tables, the operating conditions being selected in response to a plurality of drive conditions of said driving means;
second power supply means for supplying said control means with DC power by stabilizing a fluctuating output supplied by said first power supply means; and
input means for measuring the plurality of drive conditions of said driving means and supplying the plurality of drive conditions to said control means to select the operating conditions stored in the selected table,
wherein one of the plurality of tables stored in said memory means is selected in response to the value of the fluctuation detect signal and one of the plurality of operating conditions in the selected table is selected in response to the plurality of drive conditions received from said input means, so that the load can be stably driven during fluctuations in the DC power.

22. An electronic apparatus comprising:

first power supply means for receiving AC power, rectifying the AC power and outputting DC power;

detection means for detecting fluctuations of the DC power and providing a fluctuation detect signal in response to the detected fluctuations;

memory means for storing a plurality of operating conditions in a plurality of tables, the tables respectively corresponding to different values of the fluctuation detect signal;

driving means supplied with the DC power from said first power supply means, for stably driving a load using a table of operating conditions selected in accordance with the fluctuation detect signal;

control means for stably controlling said driving means by utilizing the plurality of operating conditions stored in a selected one of the tables, the operating conditions being selected in accordance with a plurality of drive conditions received from said driving means;

second power supply means for supplying said control means with power by stabilizing a fluctuating output supplied by said first power supply means; and warning means for providing a warning when the output of said detection means exceeds a predetermined threshold value, wherein one of the plurality of tables stored in said memory means is selected in response to the value of the fluctuation detect signal and one of the plurality of operating conditions in the selected table is selected in response to the plurality of drive conditions received from said driving means, so that the load can be stably driven during fluctuations in the DC power.

23. An electronic apparatus comprising:

DC power supply means for receiving AC power, rectifying the AC power and outputting DC power;

detection means for detecting fluctuations of the DC power output from said DC power supply means, and providing a fluctuation detect signal in response to the detected fluctuations;

memory means for storing a plurality of operating conditions in a plurality of tables, each table corresponding to a different value of the fluctuation detect signal;

driving means supplied with the DC power from said DC power supply means, for stably driving a load using a table of operating conditions selected in accordance with the fluctuation detect signal;

control means for stably controlling said driving means using the plurality of operating conditions stored in a selected one of the tables, the operating conditions being selected in response to a plurality of drive conditions of said driving means;

input means for detecting the plurality of drive conditions of said driving means and supplying the plurality of drive conditions to said control means to select the operating conditions stored in said selected table; and warning means for providing a warning when the output of said detection means exceeds a predetermined threshold value, wherein one of the plurality of tables stored in said memory means is selected in response to the value of the fluctuation detect signal and one of the plurality of operating conditions in the selected table is selected in response to the plurality of drive conditions received from said input means, so that the load can be stably driven during fluctuations in the DC power.

24. An electronic apparatus comprising:

first power supply means for receiving AC power, rectifying the AC power and outputting DC power;

detection means for detecting fluctuations of the DC power and providing a fluctuation detect signal in response to the detected fluctuations;

memory means for storing a plurality of operating conditions in a plurality of different tables, each table corresponding to a different value of the fluctuation detect signal;

driving means supplied with the DC power from said first power supply means, for stably driving a load using a table of operating conditions selected in accordance with the fluctuation detect signal;

control means for stably controlling said driving means in accordance with the plurality of operating conditions stored in a selected one of the tables, the operating conditions being selected in response to a plurality of drive conditions of said driving means;

second power supply means for supplying said control means with DC power by stabilizing a fluctuating output supplied by said first power supply means;

input means for detecting the plurality of drive conditions of said driving means and supplying the plurality of drive conditions to said control means to select the operating conditions stored in said selected table; and warning means for providing an alarm when the output of said detection means exceeds a predetermined threshold value, wherein one of the plurality of tables stored in said memory means is selected in response to the value of the fluctuation detect signal and one of the plurality of operating conditions in the selected table is selected in response to the plurality of drive conditions received from said input means, so that the load can be stably driven during fluctuations in the DC power.

25. Control apparatus for receiving AC power and providing DC power to a driving unit, the driving unit having a detecting device for detecting an output condition of the driving unit and providing a driving unit condition signal in accordance with the detected condition, said control apparatus comprising:

a transformer for receiving the AC power, rectifying the AC power and outputting uncontrolled DC power to the driving unit;

a detection circuit for detecting fluctuations of the uncontrolled DC power and providing a fluctuation detect signal in accordance therewith;

a memory for storing a predetermined range of driving unit control signals corresponding to the driving unit condition signals, said memory storing a plurality of tables, each table corresponding to a different value of the fluctuation detect signal;

control circuitry for selecting a driving unit control signal from one of the plurality of tables in accordance with the driving unit condition signal, and for controlling the driving unit in accordance with the selected driving unit control signal, wherein one of the plurality of tables stored in said memory is selected in response to the value of the fluctuation detect signal and one of the driving unit control signals in the selected table is selected in response to the driving unit condition signal, so that the driving unit can operate stably during fluctuations in the DC power.

26. Apparatus according to claim 25, wherein said control circuitry (1) selects the one table from among the plurality of tables according to the value of the fluctuation detect signal, (2) receives the driving unit condition signal from the driving unit detecting device, and (3) selects the driving unit control signal from the selected table according to the received driving unit condition signal.

27. Apparatus according to claim 25, wherein said control circuitry outputs an alarm signal when the value of the fluctuation detect signal is outside the predetermined range of power supply condition signals.

28. Apparatus according to claim 27, wherein said control circuitry stops the driving unit when the value of the fluctuation detect signal is outside the predetermined range of power supply condition signals.

29. Apparatus according to claim 25, further comprising the AC power supply, the driving unit, and the driving unit detecting device.

30. Control apparatus for controlling a driving unit which receives DC power, the driving unit having a detecting device for detecting a driving condition of the driving unit and providing a driving unit condition signal in accordance with the detected driving condition, said control apparatus comprising:

detection circuitry for detecting fluctuations in the DC power supplied to the driving unit;

a memory for storing a predetermined range of driving unit control signals corresponding to the driving unit condition signals, said memory having a plurality of tables, each table storing a portion of the predetermined range of driving unit control signals; and a control unit for (1) selecting one of the plurality of tables according to the fluctuations in the DC power, (2) selecting a driving unit control signal from the selected table according to the driving unit condition signal, and (3) controlling the driving unit in accordance with the selected driving unit control signal, wherein one of the plurality of tables stored in said memory is selected in response to the fluctuations in the DC power and one of the driving unit control signals in the selected table is selected in response to the driving unit condition signal, so that the driving unit can operate stably during fluctuations in the DC power.

31. Apparatus according to claim 30, wherein said control unit outputs an alarm signal when the detected power supply condition exceeds a predetermined threshold.

32. Apparatus according to claim 30, wherein said control unit stops the driving unit when the detected power supply condition exceeds a predetermined threshold.

33. Apparatus according to claim 30, further comprising the driving unit and the driving unit detecting device.

* * * * *

UNITED STATES PATENT AND TRADEMARK OFFICE
CERTIFICATE OF CORRECTION

PATENT NO. : 5,254,937
DATED : October 19, 1993
INVENTOR(S) : SHIGERU MIZOGUCHI

It is certified that error appears in the above-identified patent and that said Letters Patent is hereby corrected as shown below:

COLUMN 2

Line 46, "for" should be deleted.

COLUMN 3

Line 32, "a" should be deleted.

COLUMN 7

Line 4, "stable" should read --stably--.
Line 11, "an" should read --An--.
Line 58, "tables" should read --table--.

Signed and Sealed this

Thirty-first Day of May, 1994

Attest:

BRUCE LEHMAN

Attesting Officer     Commissioner of Patents and Trademarks